(12) United States Patent
Miller et al.

(10) Patent No.: US 6,241,297 B1
(45) Date of Patent: *Jun. 5, 2001

(54) COLLAPSIBLE PANEL CARRYING DEVICE

(75) Inventors: Dale Miller, Sioux Falls, SD (US); Roland O. Young; Larry P. Young, both of Grand Forks, ND (US)

(73) Assignee: Telpro Inc., Grand Forks, ND (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,147

(22) Filed: Dec. 20, 1999

(51) Int. Cl.[7] ............................... B65G 7/12; B66F 11/00
(52) U.S. Cl. ........................... 294/15; 294/26; 294/168; 294/169
(58) Field of Search ................ 294/15, 16, 18, 294/19.1, 22, 26, 27.1, 34, 57, 167–169; D8/14

(56) References Cited

U.S. PATENT DOCUMENTS

| | | | | |
|---|---|---|---|---|
| D. 349,437 | * | 8/1994 | Mock et al. | 294/15 X |
| 895,126 | * | 8/1908 | Thomson | 294/26 |
| 2,430,142 | * | 11/1947 | Roberts | 294/15 X |
| 2,506,349 | * | 5/1950 | Day | 294/26 |
| 2,506,407 | * | 5/1950 | Bonding | 294/26 |
| 3,007,710 | * | 11/1961 | Sykes | 294/15 X |
| 3,203,606 | * | 8/1965 | Masterson | 294/15 X |
| 3,642,251 | * | 2/1972 | Niederholtmeyer | 294/15 X |
| 4,098,442 | | 7/1978 | Moore . | |
| 4,113,160 | | 9/1978 | Spiers . | |
| 4,135,655 | * | 1/1979 | Brown | 294/15 X |
| 4,177,911 | | 12/1979 | Griffin . | |
| 4,695,085 | * | 9/1987 | Cassels | 294/15 |
| 5,069,495 | | 12/1991 | Mears . | |
| 5,171,052 | * | 12/1992 | Cunningham | 294/26 X |
| 5,794,998 | | 8/1998 | Lapierre . | |

* cited by examiner

Primary Examiner—Johnny D. Cherry
(74) Attorney, Agent, or Firm—Robert E. Kleve

(57) ABSTRACT

The invention comprises a collapsible panel carrying stick having a dual pair of elongated stick sections adapted to be extended into end to end relation with one another. The lowermost stick section has a projecting flange for insertion beneath a panel such as a dry wall panel. The uppermost stick section has a handle for carrying the stick with the panel thereon. The upper two stick sections are slidably retractable toward one another and the lower two sections are slidably retractable toward one another. The middle two stick sections are pivotally connected to one another to pivot toward one another with the sections retracted to collapse the stick sections into a smaller compact position for easier carrying.

3 Claims, 1 Drawing Sheet

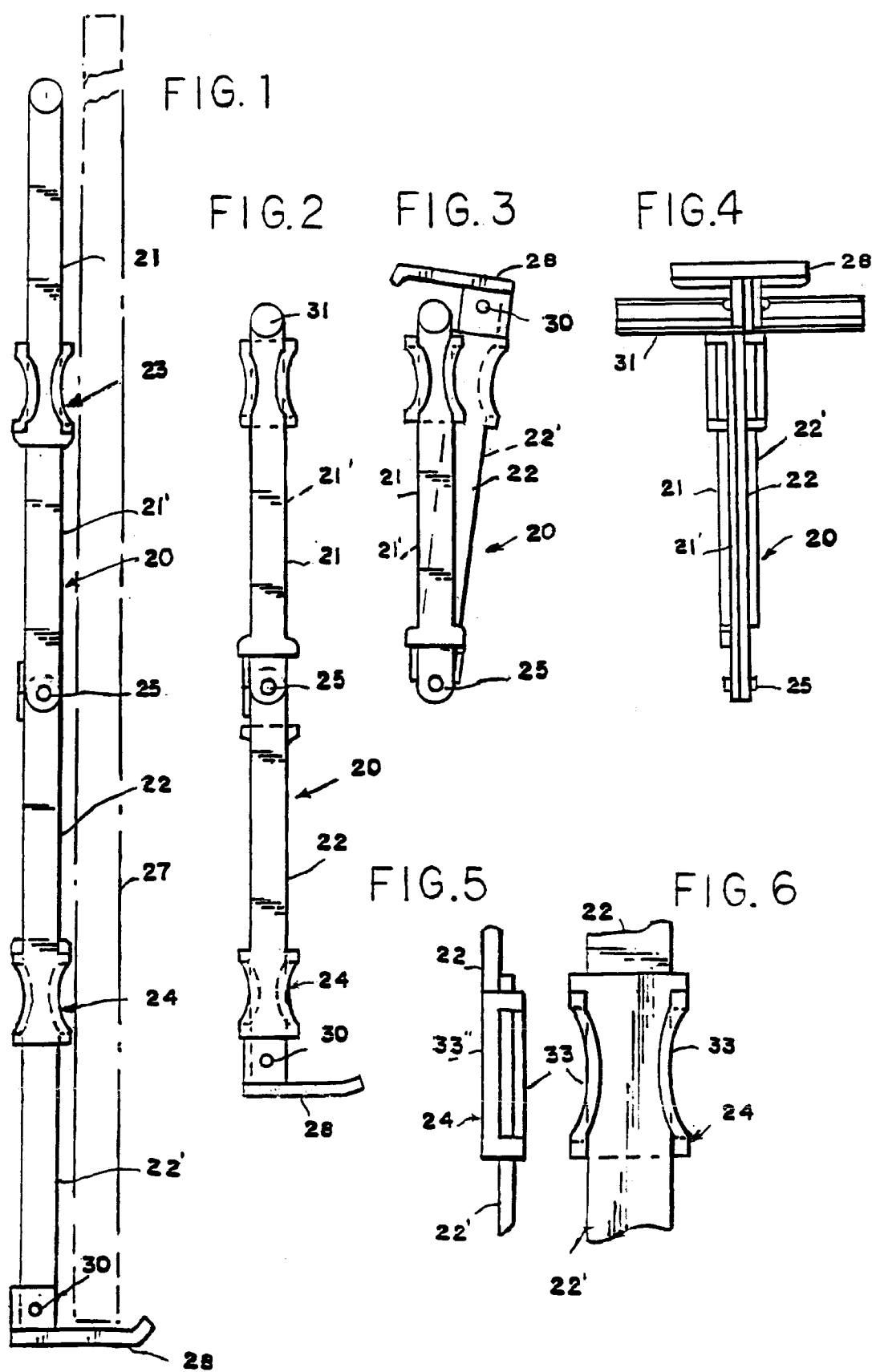

COLLAPSIBLE PANEL CARRYING DEVICE

This invention relates to foldable or collapsible panel transport or carrying devices.

It is an object of the invention to provide a novel foldable drywall transporting device which has a stick member having a projecting lug at the bottom for engaging beneath a drywall panel and a handle at the top for lifting the stick and drywall panel on the lug and with the stick member being foldable and telescoping retractable to a compact shape for storage and transportation between use.

It is a further object of the invention to provide a novel drywall carrying stick with the stick being collapsible when not in use.

It is another object of the invention to provide a novel panel carrying stick being collapsible into a smaller shape for more easier storage and transportation between use.

Further objects and advantages of the invention will become apparent as the description proceeds and when taken in conjunction with the accompanying drawing wherein

BRIEF DESCRIPTION OF THE DRAWINGS

FIG. 1 is a side elevation view of the collapsible drywall carrying stick shown in an extended operative position for carrying a drywall panel.

FIG. 2 is a side elevational view of the carrying stick illustrating the outer sections of the stick slidable and telescoping retracted in a straight line to partially collapse the stick.

FIG. 3 is a side elevation view of the carrying stick invention illustrating the upper and lower sections of the stick pivoted together to fully retract the stick into its storage position between use.

FIG. 4 is a front elevational view of the carrying stick invention illustrating the stick fully retracted and pivoted together in its storage position.

FIG. 5 is an enlarged fragmentary front elevational view of one of the two telescoping slide members formed at one end of one of the stick sectional members of the invention to guide and support the other one of the stick members.

FIG. 6 is an enlarged fragmentary side elevational view of one of the telescoping slide members.

BRIEF DESCRIPTION OF PREFERRED EMBODIMENT

Briefly stated, the invention comprises a collapsible panel carrying stick having four sections to the stick with a projecting flange at the bottom section of the stick for engagement beneath a drywall panel and a handle at the top section of the stick for carrying the stick with the panel on the projecting flange. The upper two sections of the stick are slidably retractable together and the lower two sections are also slidably retractable together and the intermediate sections are pivotally connected together to enable the upper two sections to be pivoted against the lower two sections when the sections are retracted to enable the stick to be fully collapsed together for storage when not in use.

Referring more particularly to the drawings, in FIG. 1, the collapsible drywall panel carrying stick invention 20 is illustrated. The stick has four elongated stick sections 21, 21', 22, 22'. The upper sections 21 and 21' are slidably connected together by a section guide 23 fixed to the top of the section 21', with the uppermost section 21 slidable in a straight line in the section guide 23 on section 21' to enable the two sections to telescope together as shown in FIG. 2.

Similarly, a section guide member 24 is fixed to the bottom of section 22 and the lowermost section 22', and the lowermost section 22' is slidable in a straight line in the guide section 24 to enable the lowermost section to slidably retract onto section 22 as shown in FIG. 2. The section 21' is pivotally mounted to section 22 at pivot 25 so that sections 21 and 21' may be pivoted beside sections 22 and 22' as shown in FIGS. 3 and 4 to completely collapse the stick for storage in a pocket member of the type shown in phantom lines 26 so that the carrying stick may be easily carried about by the operator with the carrying case mounted for example on the operator's belt, or with the stick carried in one of the pockets of the operator when collapsed.

FIG. 1 shows a drywall panel 27 in phantom lines in position on the projecting flange 28, which flange is pivotally mounted to the lowermost stick section 22' at pivot 30 so that the flange may be pivoted from its operative position as shown in FIG. 1 counterclockwise to a more compact position when collapsed as shown in FIGS. 3 and 4.

A handle 31 is fixed to the top section 21 for carrying the stick so that the operator may fully extend the stick sections to their operative position as shown in FIG. 1 and place a dry wall panel 27 on the projecting bottom flange 28 and grasp the handle 31 to raise the stick flange and drywall panel and carry the stick and panel by the handle to a different location for transporting the drywall panel from one place to another.

The outer stick sections 21 and 22' each have a pair of laterally projecting lugs 33 and 33' which engage the guide members 23 and 24 when the stick members are slid outward to limit and stop the outward movement of the stick sections 21 and 22' relative to stick sections 21' and 22 when the stick sections are fully extended.

In its operation, the operator will fully extend the stick sections 21 and 22' relative to sections 21' and 22 and while grasping the device 21 by the handle by his hand will swing the device over the outside of the drywall panel and downward along the outside of the panel with his arm, when the panel is between the operator and the device and when the panel is on its edge on the floor with its four foot width upward. After the device is swung over the outside of the drywall, the operator will reach downward with his arm until the lower end of the device with the projecting flange 28 is fully on the floor. When the device is fully on the floor, the operator will raise the panel slightly and slide the projecting flange 28 inward beneath the panel, with the flange projecting inward toward the operator. Since the device has preferably only about a twenty seven or twenty inch length when fully extended, the operator must reach down with his arm in order to slide the flange beneath the panel. Once the flange is beneath the panel, the operator may raise the device by the handle and carry the device and the panel from place to place with his arm.

When it is desired to store the carrying stick, the sections will be telescoped together and then pivoted together as described and placed in the carrying case of the operator.

The guide members 23 and 24 each having a pair of elongated rib members 33 and 33' fixed at their ends to the opposing elongated sides of stick sections 21' and 22 with their intermediate portions bent or bowed about sides of their respective stick sections 21 and 22' to provide a straight line guide for these sections to slide along to telescope the sections together. Various other types of guide structures may be provided.

Thus it will be seen that a novel carrying stick has been provided for carrying a drywall panel from one place to another and which stick may be collapsed to a smaller compact storage position for storage in a carrying case or for carrying in an operator's pocket.

It will be obvious that various changes and departures may be made to the invention without departing from the spirit and scope thereof, and accordingly, it is not intended that the invention be limited to that specifically described in the specification or as illustrated in the drawing, but only as set forth in the appended claims wherein:

What is claimed is:

1. A collapsible panel carrying stick apparatus comprising a dual pair of sticks, one of said sticks in one of said pair being pivotally mounted to one of said sticks in the other of said pair, one of said sticks in each pair of sticks having a guide way for slidably receiving and retracting and telescoping the other of said sticks in each pair of sticks, whereby said one pair of sticks may be pivoted to an end to end relation to the other of said pair of sticks and said other sticks in each pair may be telescoped to an extended position and to place all of said sticks in an aligned extended end to end relation in an upward position; with the other of said sticks in one pair at an upper end of the sticks and the other of said sticks in the other pair at the lower end of the sticks for use;

a handle mounted to the other stick at the upper end of the sticks;

a projecting flange mounted to the other of said sticks at the lower end of the sticks whereby when the apparatus is in use, the projecting flange may be placed beneath a panel and an operator may raise the stick apparatus and the panel by the handle for carrying the stick and panel, and whereby the sticks in each pair of sticks may be slidably retracted toward one another along said guide ways, and one of said pair of sticks pivoted toward the other of said pair of sticks into a compact side by side relative position for storage when not in use.

2. A collapsible panel carrying stick according to claim 1, wherein said sticks each comprise an elongated metal plate having a width greater than its breadth and with the sticks having pivotal connection to one another and to the projecting flange being pivoted about axes perpendicular to their width and to the projection of the flange.

3. A collapsible panel carrying stick apparatus comprising a dual pair of sticks, pivot means pivotally connecting one of said sticks in one pair to one of said sticks in the other pair, guide way means for each pair of sticks for slidably receiving and retracting and telescoping away the other of said sticks with the one stick in each pair, whereby one pair of sticks may be pivoted apart from the other pair of sticks and said sticks may be telescoped away relative to one another in each pair and to place all the sticks in an aligned extended end to end relation in an upward position, with the other of said sticks in one pair at the upper end of the sticks and the other of said sticks in the other pair at the lower end of the sticks for use;

a handle mounted to the other stick at the upper end of the sticks;

a projecting flange mounted to the other stick at the lower end of the sticks whereby when the sticks are extended for use, the projecting flange may be placed beneath a panel and an operator may raise the stick apparatus and panel by the handle for carrying the stick and panel; and whereby the sticks in each pair of sticks may be slidably retracted toward one another along said guide way means and one of said pair of sticks pivoted toward the other of said pair of sticks in a compact side by side relative position for storage when not in use.

* * * * *